United States Patent
Lutz et al.

(10) Patent No.: US 7,364,201 B2
(45) Date of Patent: Apr. 29, 2008

(54) VEHICLE OCCUPANT RESTRAINT SYSTEM

(75) Inventors: Jürgen Lutz, Steinheim (DE); Ralf Strobel, Schwäbisch-Gmünd (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/062,425

(22) Filed: Feb. 22, 2005

(65) Prior Publication Data

US 2005/0140132 A1    Jun. 30, 2005

Related U.S. Application Data

(62) Division of application No. 10/346,840, filed on Jan. 17, 2003, now abandoned.

(30) Foreign Application Priority Data

Jan. 18, 2002    (DE) .......................... 202 00 741 U

(51) Int. Cl.
*B60R 22/46*    (2006.01)
(52) U.S. Cl. ..................... 280/806; 297/480
(58) Field of Classification Search ............... 280/806; 297/480
See application file for complete search history.

(56) References Cited

U.S. PATENT DOCUMENTS

| | | | |
|---|---|---|---|
| 3,292,744 A * | 12/1966 | Replogle | ..................... 188/135 |
| 4,015,860 A | 4/1977 | Tisell et al. | |
| 4,767,161 A | 8/1988 | Sedlmayr et al. | |
| 4,932,722 A | 6/1990 | Motozawa | |
| 6,053,532 A | 4/2000 | Wilkins et al. | |
| 6,095,615 A | 8/2000 | Wier | |
| 6,199,954 B1 | 3/2001 | Holzapfel | |
| 6,237,958 B1 | 5/2001 | Patrickson | |
| 6,305,713 B1 | 10/2001 | Pywell et al. | |
| 6,357,795 B1 | 3/2002 | Krauss et al. | |
| 6,382,674 B1 | 5/2002 | Specht et al. | |
| 6,513,880 B2 | 2/2003 | Yamaguchi et al. | |
| 6,527,299 B2 | 3/2003 | Specht et al. | |
| 6,565,121 B2 | 5/2003 | Knych et al. | |
| 6,938,926 B2 * | 9/2005 | Edrich et al. | ................ 280/806 |
| 6,942,251 B2 * | 9/2005 | Birk et al. | ................... 280/806 |
| 2002/0190515 A1 | 12/2002 | Birk et al. | |
| 2003/0155801 A1 * | 8/2003 | Tatematsu et al. | .......... 297/480 |
| 2003/0164610 A1 | 9/2003 | Edrich et al. | |

FOREIGN PATENT DOCUMENTS

| | | |
|---|---|---|
| DE | 2543068 | 4/1976 |
| DE | 3407376 | 11/1985 |
| DE | 3715861 | 12/1988 |
| DE | 4414031 | 10/1995 |
| DE | 29806199 | 10/1998 |
| DE | 10011829 | 12/2000 |
| DE | 19960848 | 6/2001 |
| DE | 20110046 | 12/2001 |

* cited by examiner

*Primary Examiner*—Ruth Ilan
*Assistant Examiner*—Joselynn Y Sliteris
(74) *Attorney, Agent, or Firm*—Crowell & Moring LLP

(57) ABSTRACT

A vehicle occupant restraint system comprises a safety belt arrangement with a belt webbing, a belt buckle and one of an end- and deflection fitting. The restraint system further comprises two tracks with which a vehicle seat is connected and which, for displacement of the vehicle seat, are constructed for engagement into counter-tracks fixed to a floor of the vehicle. An elongated, rigid fastening element is provided which extends beneath the seat between the tracks and which is connected with both of the tracks. At least one belt tensioner is mounted to the fastening element.

19 Claims, 8 Drawing Sheets

VEHICLE OCCUPANT RESTRAINT SYSTEM

RELATED APPLICATION

This application is a divisional of U.S. patent application Ser. No. 10/346,840, filed Jan. 17, 2003 now abandoned.

TECHNICAL FIELD

The invention relates to a vehicle occupant restraint system comprising a safety belt arrangement.

BACKGROUND OF THE INVENTION

In order to avoid a relative displacement between the vehicle occupant, who is sitting on the vehicle seat and, for example, a belt buckle or a belt tensioner, it is advisable to arrange such elements of the safety belt system on the vehicle seat itself. Especially in the belt tensioning, such arrangement is of advantage.

It is an aim of the invention to provide a vehicle occupant restraint system which is able to be used flexibly, using elements of a safety belt system arranged on the vehicle seat.

BRIEF SUMMARY OF THE INVENTION

According to the invention, a vehicle occupant restraint system comprises a safety belt arrangement with a belt webbing, a belt buckle and an end- or deflection fitting. The restraint system further comprises two tracks with which a vehicle seat is connected and which, for displacement of the vehicle seat, are constructed for engagement into countertracks fixed to a floor of the vehicle. An elongated, rigid fastening element is provided which extends beneath the seat between the tracks and which is connected with both of the tracks. At least one belt tensioner is mounted to the fastening element. The use of the fastening element allows the required elements of the safety belt system to be connected to the vehicle seat as desired. As the fastening element extends under the seat, no visual impairment of any kind is produced. In addition, the fastening element can fulfill a further task by contributing to the stability of the vehicle seat.

By means of the invention, a flexible modular construction system can be realized. Thus, for example, two belt tensioners can be provided which are both fastened to the fastening element. One of these belt tensioners can be a buckle tensioner and one of the belt tensioners can be an end- or deflection fitting tensioner. However, if only one belt tensioner is provided, a corresponding end- or deflection fitting for the other end of the safety belt can just as well be fastened to the fastening element. The fastening element is preferably designed such and coordinated with the geometry of belt tensioners, end- and deflection fittings such that without altering the fastening element both one or more belt tensioners, or directly an end- or a deflection fitting, can be fastened thereon.

Preferably, one of the belt tensioners comprises a flexible engagement means, for example a traction cable which is connected with the belt buckle or with an end- or deflection fitting, and the fastening element has a deflection for the engagement means. This deflection is preferably constructed in one piece with the fastening element, but can also, following the modular principle, be a separate component which is only fastened to the fastening element when it is desired for the equipping of the vehicle concerned.

Advantageously, the fastening element has a guide for an end- or deflection fitting, in which the end- or deflection fitting moves during a tensioning process of the safety belt. This guide is also preferably constructed in one piece with the fastening element, but may also be designed as an additional element which is only mounted on the fastening element when it is required.

In an advantageous embodiment of the invention, the fastening element has a deflection for the belt webbing of the safety belt. As the fastening element, and hence also the belt tensioner, are situated underneath the seat area or underneath the vehicle seat, such a deflection is advantageous to the effect of ensuring a run of the belt webbing which is as free from friction as possible. This deflection is also preferably constructed in one piece with the fastening element, but may also be constructed as a separate element.

Preferably, the belt tensioner is an end- or deflection fitting tensioner, and the fastening element is a strut which is U-shaped in cross-section and which extends on the side of the end- or deflection fitting tensioner upwards along the seat and in this region forms a U-shaped guide and deflection for the belt webbing.

Preferably, the belt webbing is folded transversely to the longitudinal direction of the belt webbing during it being tensioned. This folding reduces the necessary overall size of the fastening element. A folding of the belt webbing can be advantageously achieved in that the width of the U-shaped fastening element is reduced in a region to the side of the seat, in order to become narrower than the belt webbing and to fold the latter as it slides along this fastening element during the tensioning process.

It is also possible for that piece of the belt webbing which is to be withdrawn to be sewn together along its longitudinal direction so that its width is reduced. Hereby, the width of the belt webbing is already reduced, so that the fastening element can be kept narrow.

In a preferred embodiment of the invention, the connection between the engagement means and the end- or deflection fitting is realized by a screw connection. This is advantageous for several reasons. Firstly, in this way, in accordance with the modular assembly principle, a restraint system can be configured without difficulty, which has a belt tensioner, just as well a restraint system in which the end- or deflection fitting is fixed directly to the fastening means. On the other hand, such a connection allows the driver's seat, as usual, to be mounted as the last element in the vehicle, i.e. after the installation of the safety belt system. In this case, the end- or deflection fitting which is already arranged in the vehicle is simply screwed with the engagement means after the installation of the vehicle seat.

Alternatively, and with the same above-mentioned advantages, the connection between the engagement means and the end- or deflection fitting can be realized by a connection element in the form of a coupling mechanism.

The connection element can have, for example, a threaded sleeve and a thread bolt, one of the two said components being connected with the engagement means and the other with the end- or deflection fitting.

In another embodiment, the connection element has a first coupling half with at least one opening and a second coupling half with a detent cam, the detent cam being able to engage into the opening and being able to fix the coupling halves to each other, one of the coupling halves being connected with the engagement means and the other with the end- or deflection fitting.

According to another embodiment, the first coupling half of the connection element has at least one depression, whereas the second coupling half has at least one projection, which can engage into the depression and thus fix the two coupling halves to each other. One of the coupling halves is connected with the engagement means and the other with the end- or deflection fitting. The two coupling halves can be surrounded by a displaceable casing to secure the coupling.

The coupling mechanism may also be an insert coupling, in particular a ball-and-socket coupling.

All these coupling mechanisms permit a rapid and reliable fastening of an end- or deflection fitting to the engagement means of the belt tensioner.

Preferably, the engagement means and the end- or deflection fitting are attached on their connection point on the fastening element by means of a detachable component. In this way, the connection point can be secured to the fastening element, so that it is protected from damage and a rattling in the vehicle is avoided. The component can be constructed such that it has a predetermined breaking point, so that on tensioning, the connection point is movable without a time delay.

Preferably, a retaining device which is coordinated with the geometry of the end- or deflection fitting is provided on the fastening element, which retaining device, when an end- or deflection fitting tensioner is not provided, permits a direct fastening of the end- or deflection fitting to the fastening element. It is advantageous if the retaining device is formed by a coupling half of the connection element, which in this case is firmly connected with the fastening element. In another possible embodiment, the end- or deflection fitting has at least one eye and the fastening element has a counter-bore, and a screw extending through the eye and the counter-bore fixes the end- or deflection fitting to the fastening element.

To shorten the installation time, it is advantageous if the fastening element and the belt tensioner or tensioners form a pre-assembled unit.

It is particularly advantageous if the tracks and the fastening element form a pre-assembled slide, to which the vehicle seat can be fastened; the slide, the belt buckle and the at least one belt tensioner forming a pre-assembled unit here. In this case, the restraint system is preconfigured, following thereto the vehicle seat is fastened to the tracks, the vehicle seat is installed in the vehicle and finally the end fitting or the deflection fitting is connected with the fastening element or with the belt tensioner. With this system, the wishes of individual customers can be fulfilled in a flexible, quick and simple manner.

The invention also concerns a vehicle seat connected with the tracks.

DETAILED DESCRIPTION OF THE PREFERRED EMBODIMENTS

Figure 1:
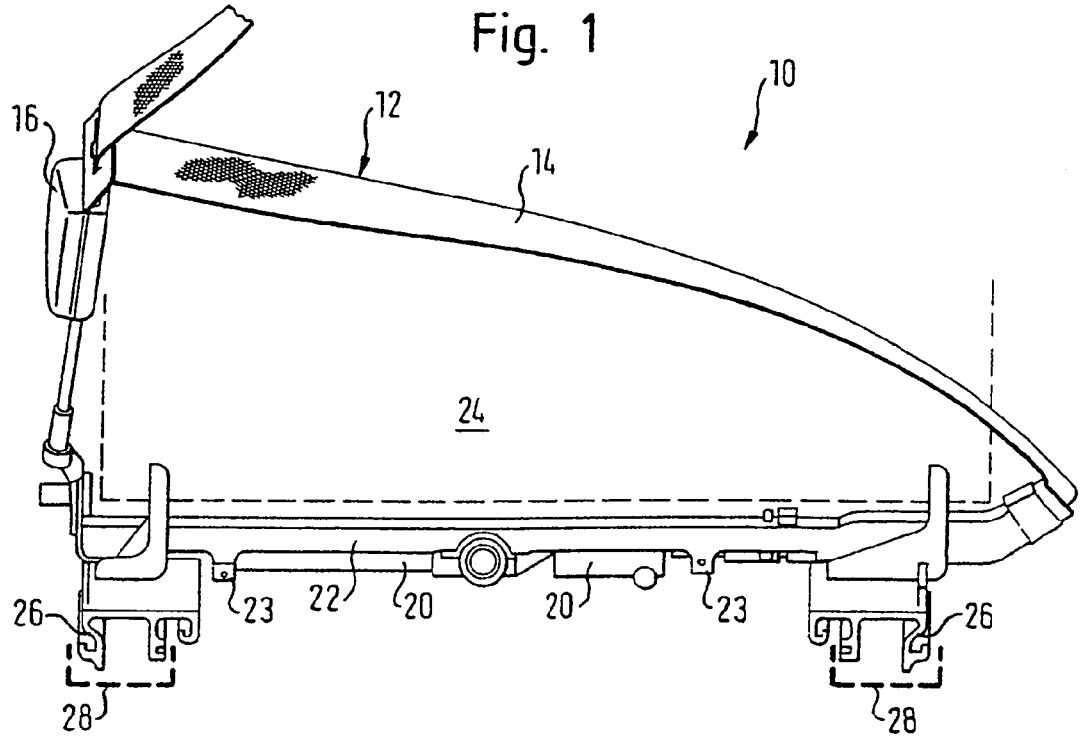
FIG. 1 shows a diagrammatic illustration of a vehicle occupant restraint system in accordance with the invention, with a vehicle seat and a safety belt arrangement.
Figure 3:
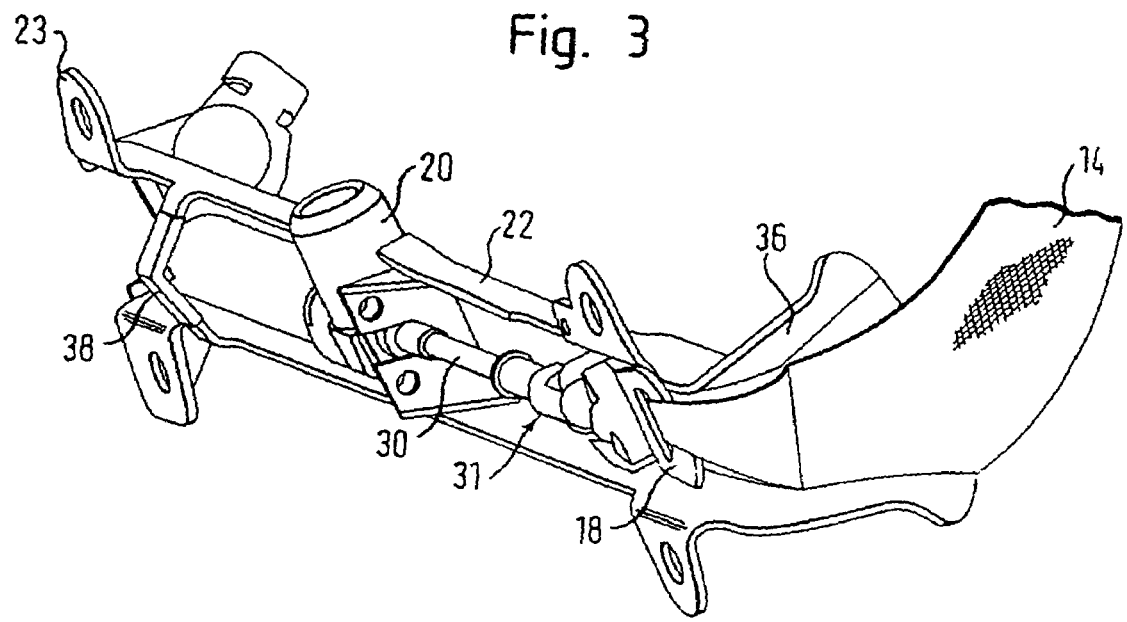
FIG. 3 shows a fastening element with a belt webbing guide of the vehicle occupant restraint system in accordance with the invention, according to FIG. 1.

The vehicle occupant restraint system 10 shown in FIG. 1 comprises a safety belt arrangement 12, with a belt webbing 14, a belt buckle 16 and a fitting 18 connected with the belt webbing 14 (see FIG. 3). At least one belt tensioner 20 is provided. In the example shown in FIG. 1, a buckle tensioner (left-hand tensioner 20 in FIG. 1) and an end- or deflection fitting tensioner (right-hand tensioner 20 in FIG. 1) are provided, which are preferably both known pyrotechnically operated linear tensioners. Equally, however, only one belt tensioner can be provided to carry out both tensioning movements.

In addition, an elongated, rigid fastening element 22 is provided which in this example is constructed as a metal plate bent in a U-shape. The fastening element 22 is arranged underneath a vehicle seat 24 (indicated by dashed lines in FIG. 1) and preferably fastened to the vehicle seat 24 by means of projecting tongues 23 constructed on the fastening element 22. The fastening element 22 is fastened to two tracks 26, which are connected with the vehicle seat 24. The tracks 26 are constructed such that they engage into counter-tracks 28 which are fixed to the floor of the vehicle; they serving for displacing the vehicle seat. The arrangement of the vehicle seat 24 on the tracks 26 and 28 corresponds to the known prior art and is not described in further detail here.

The vehicle occupant restraint system according to the invention is based on a modular assembly system. The fastening element 22, which is fastened to the vehicle seat, has a plurality of possibilities for fastening the components of the restraint system, so that the vehicle occupant restraint system can be flexibly and simply configured for the arrangement of the restraint system which is desired for the respective vehicle. The belt tensioner or tensioners 20 are in any case fastened to the fastening element 22. The belt buckle 16 and/or the fitting 18 can each either be mounted to the belt tensioner(s) 20 or, if a use of a belt tensioner is not desired for this element, via a retaining device 21—constructed on the fastening element or connected therewith—directly to the fastening element 22 (see, for example, FIG. 4). To increase the stability of the fastening element 22, a strut 38 is provided in the region of a belt tensioner 20.

Preferably, a guide 31 for the fitting 18 is formed on the fastening element 22, in which guide 31 the fitting moves during tensioning.

Figure 2:
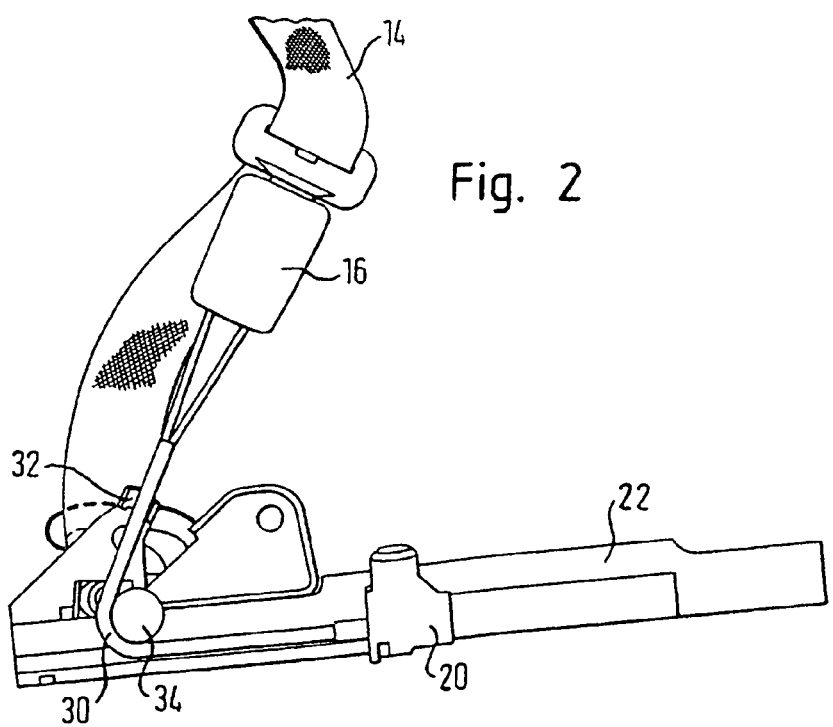
FIG. 2 shows a detail from FIG. 1.

On the fastening element 22 in accordance with FIG. 2, in addition a deflection 34, e.g. a roller, is arranged, via which the engagement means 30 is deflected from the belt buckle 16, which is aligned approximately vertically, to the belt tensioner 20 arranged horizontally on the fastening element 22. For the buckle tensioner 16, 20 in addition a guide 32 is provided in the form of a half ring, which at the same time serves to fix the belt buckle 16 in its position during normal operation. The guide 32 and the deflection 34 are preferably constructed at one end of the fastening element 22.

Figure 5:
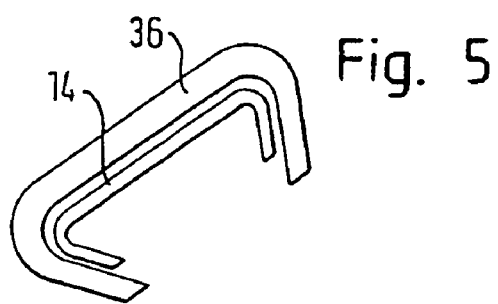
FIG. 5 shows a cross-section of a belt guide of a vehicle occupant restraint system in accordance with the invention.

As an alternative to this, the deflection for the belt webbing 14 or for an engagement means 30 connecting the belt buckle 16 or fitting 18 and tensioner 20, respectively, can be achieved in that the ends of the U-shaped fastening element 22 are bent upwards along a section laterally on the vehicle seat 24. The deflection is given the reference number 36 and is constructed, as it were, in one piece on the fastening element 22. The cross-section of the deflection 36 is narrowed in the direction towards the belt tensioner 20 to such an extent that it becomes smaller than the width of the belt webbing 14, whereby the belt webbing 14 is folded during it being drawn in, this folding occurring transversely to its longitudinal direction (see FIG. 5).

Figure 4:
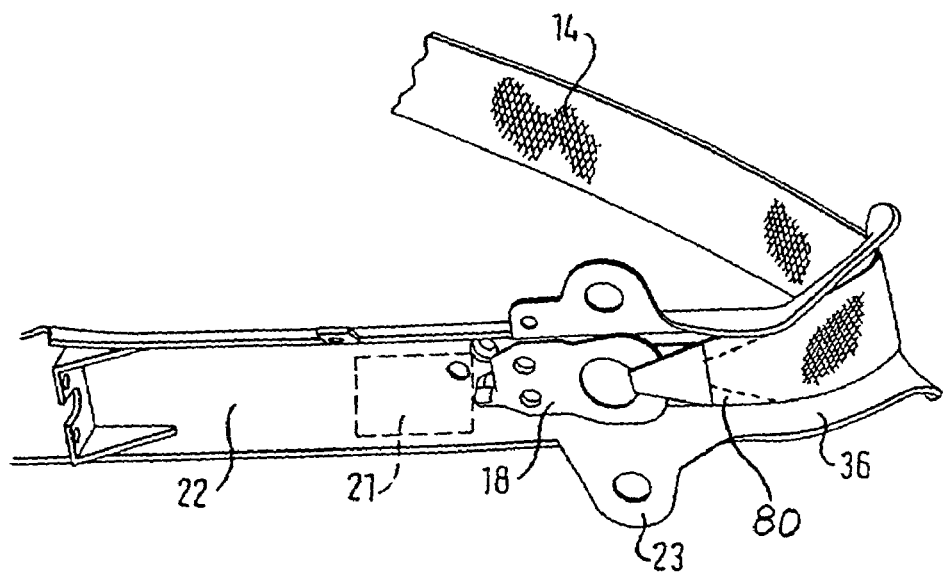
FIG. 4 shows a detail of a fastening element of a vehicle occupant restraint system in accordance with the invention.

Alternatively, the belt webbing 14 can also be sewn together across the drawing-in length, along its longitudinal direction, so that its width is reduced, as shown by the dashed line 80 in FIG. 4.

In order to be able to utilize the flexibility of the modular assembly system as well as possible, a fitting 18 is always provided on that end of the belt webbing 14 which is directed to the fastening element 22. This fitting 18 may, as in the example illustrated in FIGS. 3 and 4, be constructed as an end fitting or else, as further described, as a deflection fitting. The fitting 18 is either connected via the engagement means 30 with one of the belt tensioners 20 (FIGS. 1, 3) or, as indicated in FIG. 4, is connected directly with the fastening element 22, depending on the desired configuration of the restraint system.

Figure 6:
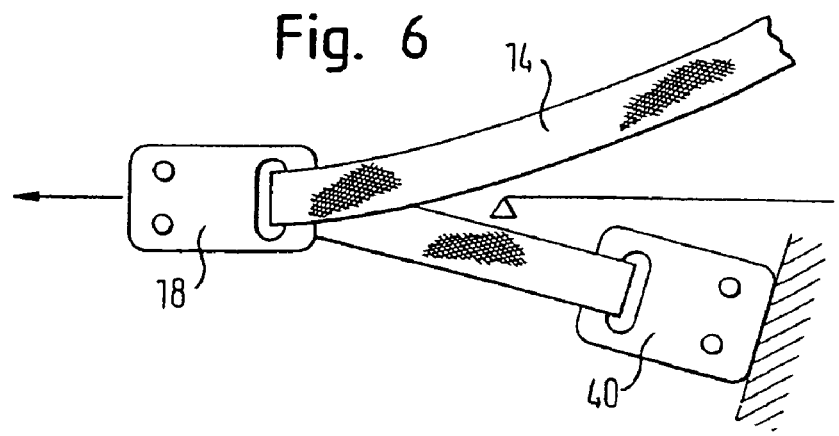
FIG. 6 shows a detail of a vehicle occupant restraint system in accordance with the invention.
Figure 7:
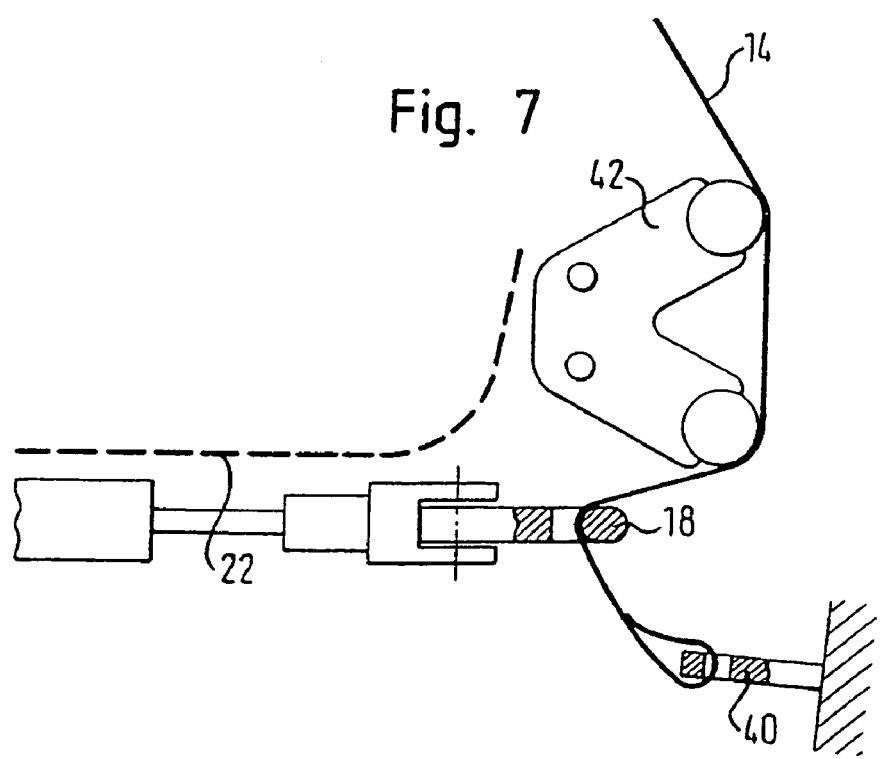
FIG. 7 shows a detail of a vehicle occupant restraint system in accordance with the invention.

In another alternative, which is shown in FIGS. 6 and 7, the fitting 18 is constructed as a deflection fitting. In this case, a further fitting 40 is connected with the belt webbing 14 and is firmly fixed to the vehicle. The fitting 18 is either connected via the engagement means 30 with a belt tensioner 20 or is directly connected with the fastening element 22.

The use of a deflection fitting at this point offers two advantages. Firstly, the length of the tensioning path is doubled, secondly it is thus possible to already install the safety belt completely in the vehicle before the vehicle seat is installed with the vehicle occupant restraint device. In this case, the fitting 18 must be constructed such that it can be subsequently introduced into the belt webbing path.

In the embodiment shown in FIG. 7, in addition a deflection 42 for the belt webbing is provided, which is equipped with two deflection rollers, and which is preferably likewise connected with the fastening element 22. This deflection 42 serves to optimize the course of the belt webbing 14 in front of the deflection fitting 18.

The fitting 18 can be connected with the engagement means 30 by means of various connection elements which are described in further detail below.

Figure 8:
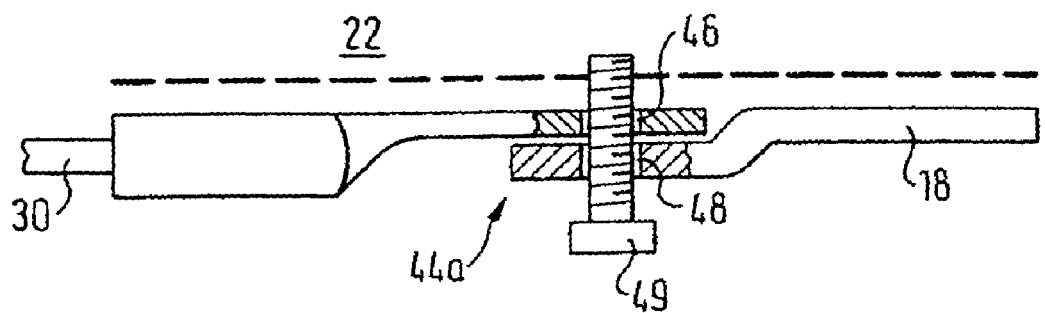
FIGS. 8 to 14 show various connections of an end- or deflection fitting with an engagement means for use in a vehicle occupant restraint system in accordance with the invention.

The solution for the connection element 44a, illustrated in FIG. 8, is suitable above all in those cases in which the fitting 18 is also to be fixed to the fastening element 22 without a connection with a tensioner 20. In this case, the connection element 44a consists of an eye 46, 48 constructed on the fitting 18 and on the engagement means 30, which eyes 46, 48 can be connected with each other by a screw 49 or a fastening bolt.

The connection element 44a is preferably designed such that the belt webbing 14 is prevented from rotation, e.g. is designed so as to be flat.

The screw 49 can, at the same time, be used to fix the connection element 44a to the fastening element 22. In this case, preferably a predetermined breaking point is provided on the screw 49, on the fastening element 22 or on the connection element 44a, so that the connection element 44a can come free from the fastening element 22 on tensioning.

Figure 9A:
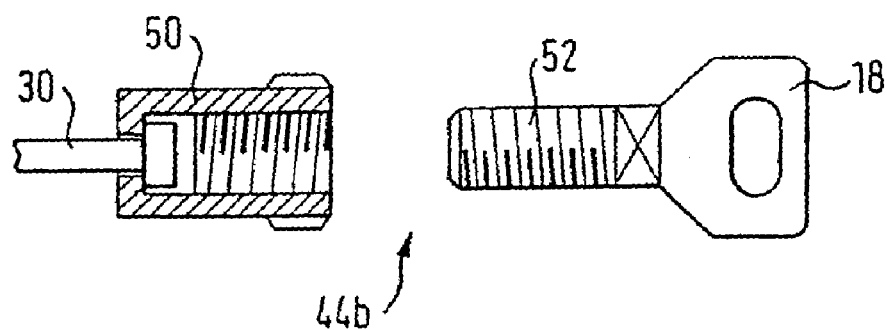
Figure 9B:
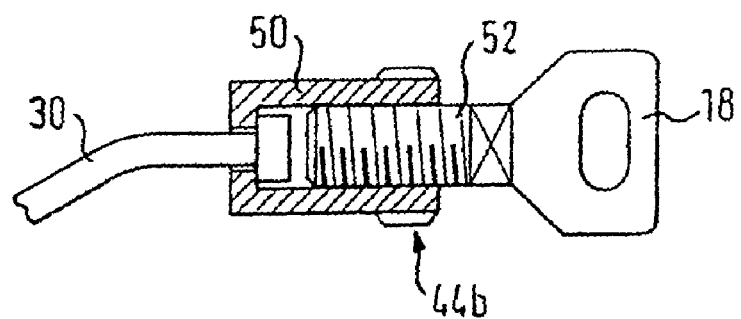

Another alternative for connecting the fitting 18 with the engagement means 30 is shown in FIGS. 9a and b. In this case, a threaded sleeve 50 is rotatably fastened to the engagement means 30. A threaded bolt 52 is constructed in one piece on the fitting 18, which threaded bolt 52 is able to be screwed with the threaded sleeve 50. This variant forms the connection element 44b.

Figure 10:
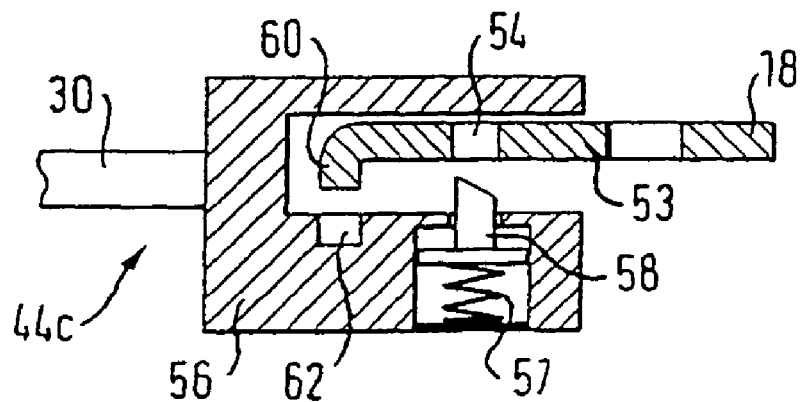

A further connection element 44c is illustrated in FIG. 10. Here, this is a detent cam coupling, comparable with that which is used in a belt buckle. A first coupling half 53, which is constructed here in one piece with the fitting 18, has an opening 54, into which, on insertion of the fitting 18 into a second coupling half 56, connected with the engagement means 30, a detent cam 58 engages, which is held so as to be movable in the second coupling half 56 and is acted upon by a spring 57. A detent nose 60, constructed on the fitting 18, additionally engages into a depression 62 constructed in the second coupling half 56.

Figure 11:
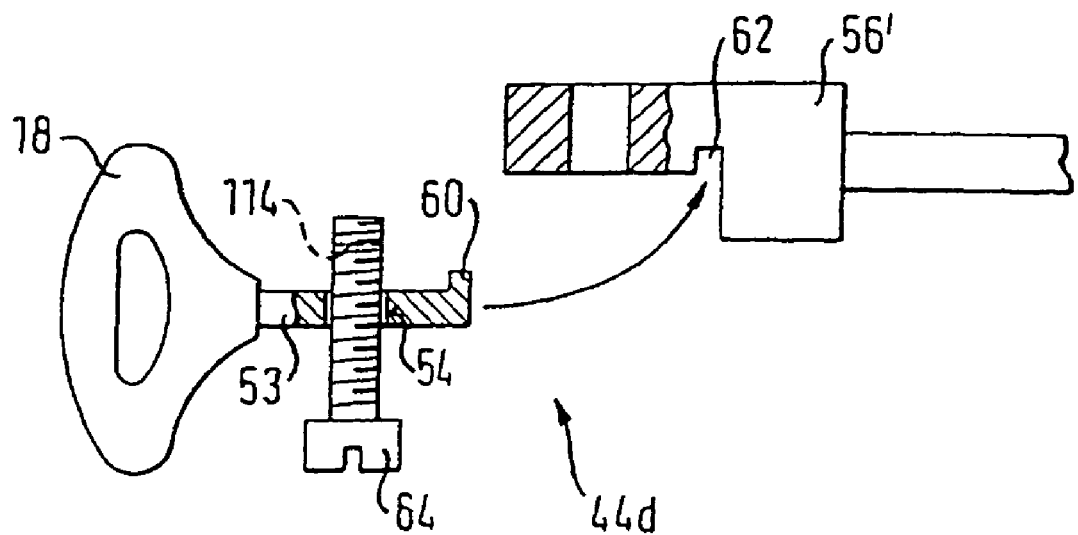

It is also possible, as shown in FIG. 11 for the connection element 44d, to construct the detent cam 58 in the coupling piece 56' by a screw 64.

Figure 12A:
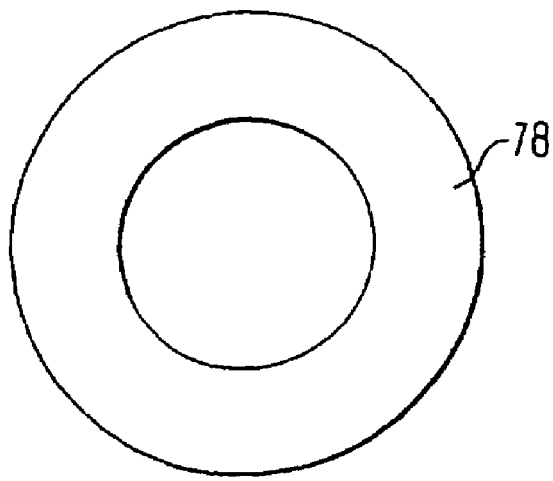
Figure 12B:
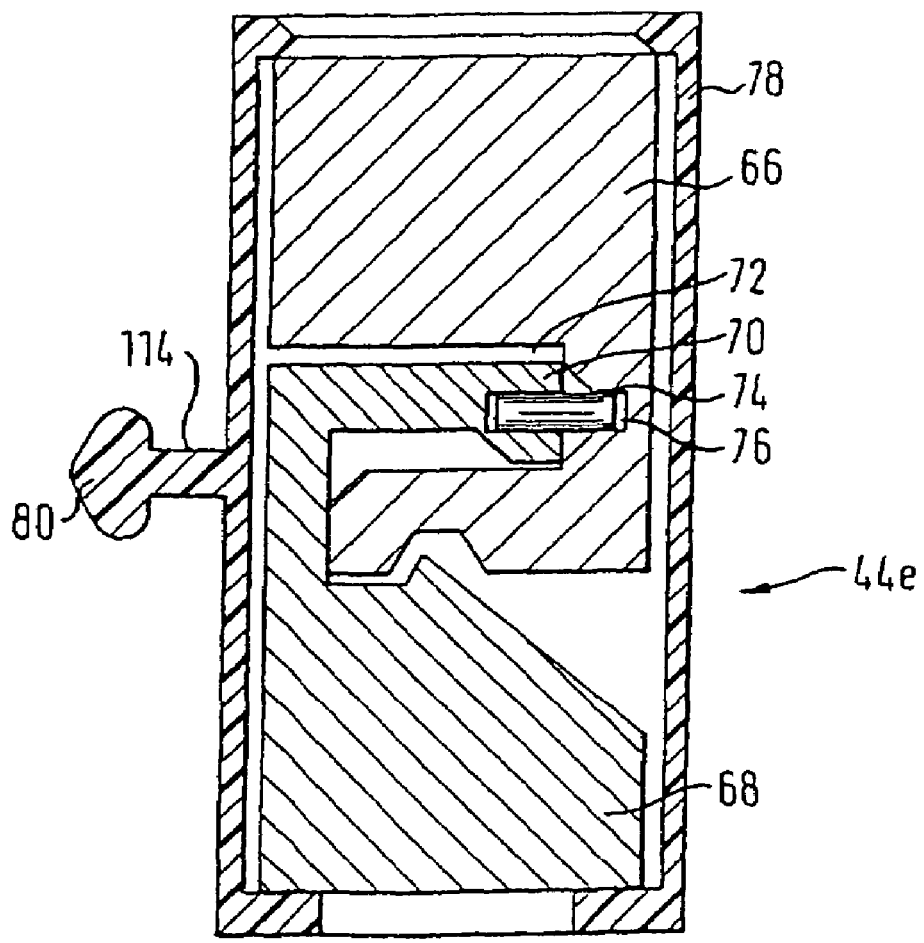

In FIGS. 12a and b, an insert coupling is illustrated as connection element 44a, FIG. 12a showing the cross-section of the coupling. The insert coupling has a first coupling half 66 which is connected with the fitting 18 or with the engagement means 30, and a second coupling half 68 which is connected with other respective component 30, 18. A nose 70 of the second coupling half 68 engages into a depression 72 of the first coupling half 66. In the nose 70 in addition a displaceably mounted cylinder bolt 74 is arranged, which engages into a further depression 76 in the first coupling half 66. After the first coupling half 66 and the second coupling half 68 have been joined together, a plastic sleeve 78 is pushed over the two coupling halves 66, 68, so that the coupling 44e does not rattle and is secured against unintentional opening. On the plastic sleeve 78, a clip 80 is constructed, by which the coupling 44e can be fixed to the fastening element 22. This fixing serves as an anti-rotation device and also for preventing a rattling noise.

Figure 13:
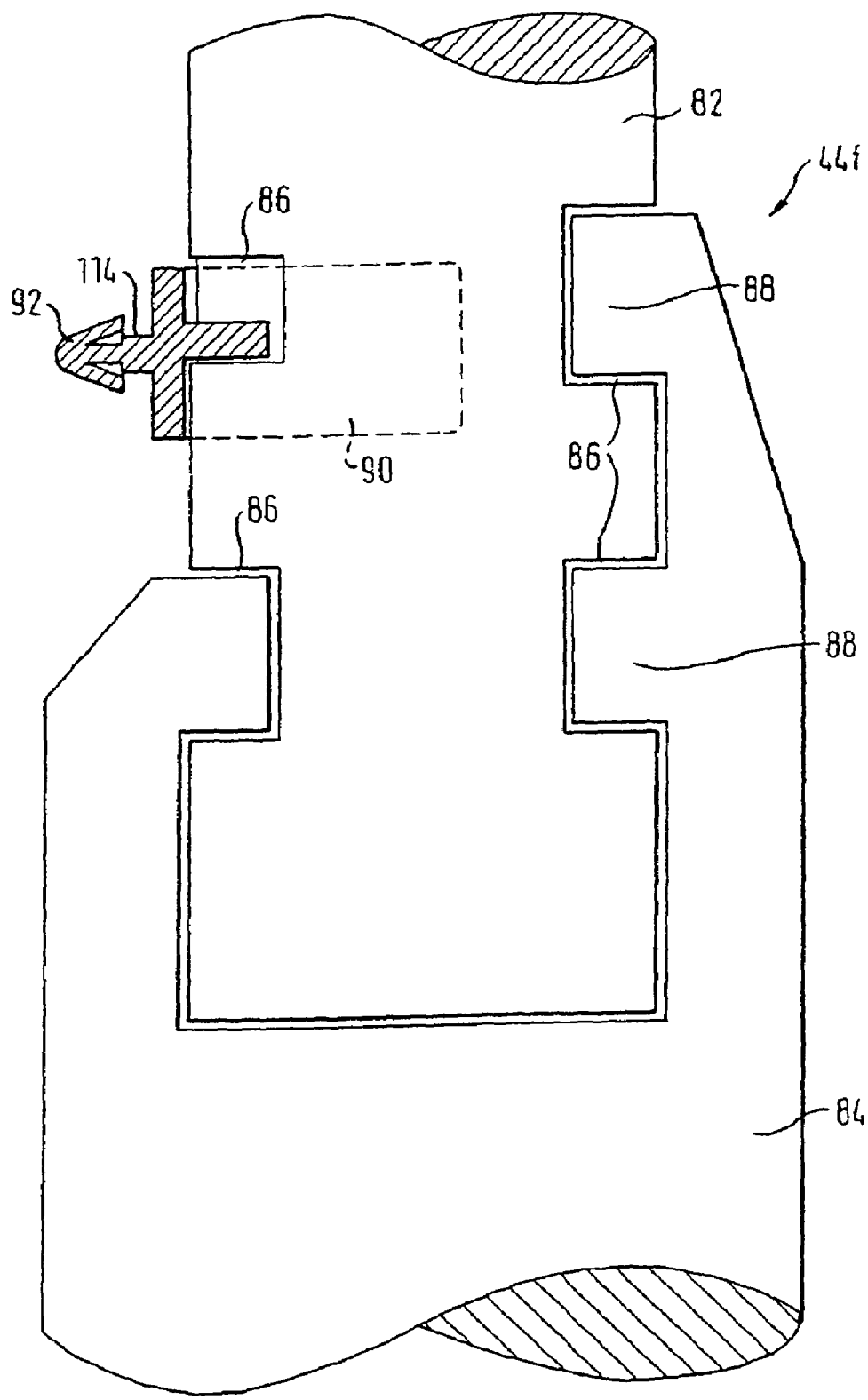

A further embodiment of a connection element 44f is shown in FIG. 13. This is likewise an insert coupling with a first coupling half 82 and a second coupling half 84, which are each connected with the fitting 18 or with the engagement means 30. On the first coupling half 82, depressions 86 are provided, into which detent projections 88 of the second coupling half 84 engage. One of the coupling halves, in this case the first coupling half 82, is preferably embraced by a clip 90, which has a detent nose 92 for engagement into the fastening element 22. The clip 90 can be additionally secured against rotation in one of the depressions 86 of the first coupling half 82.

Figure 14:
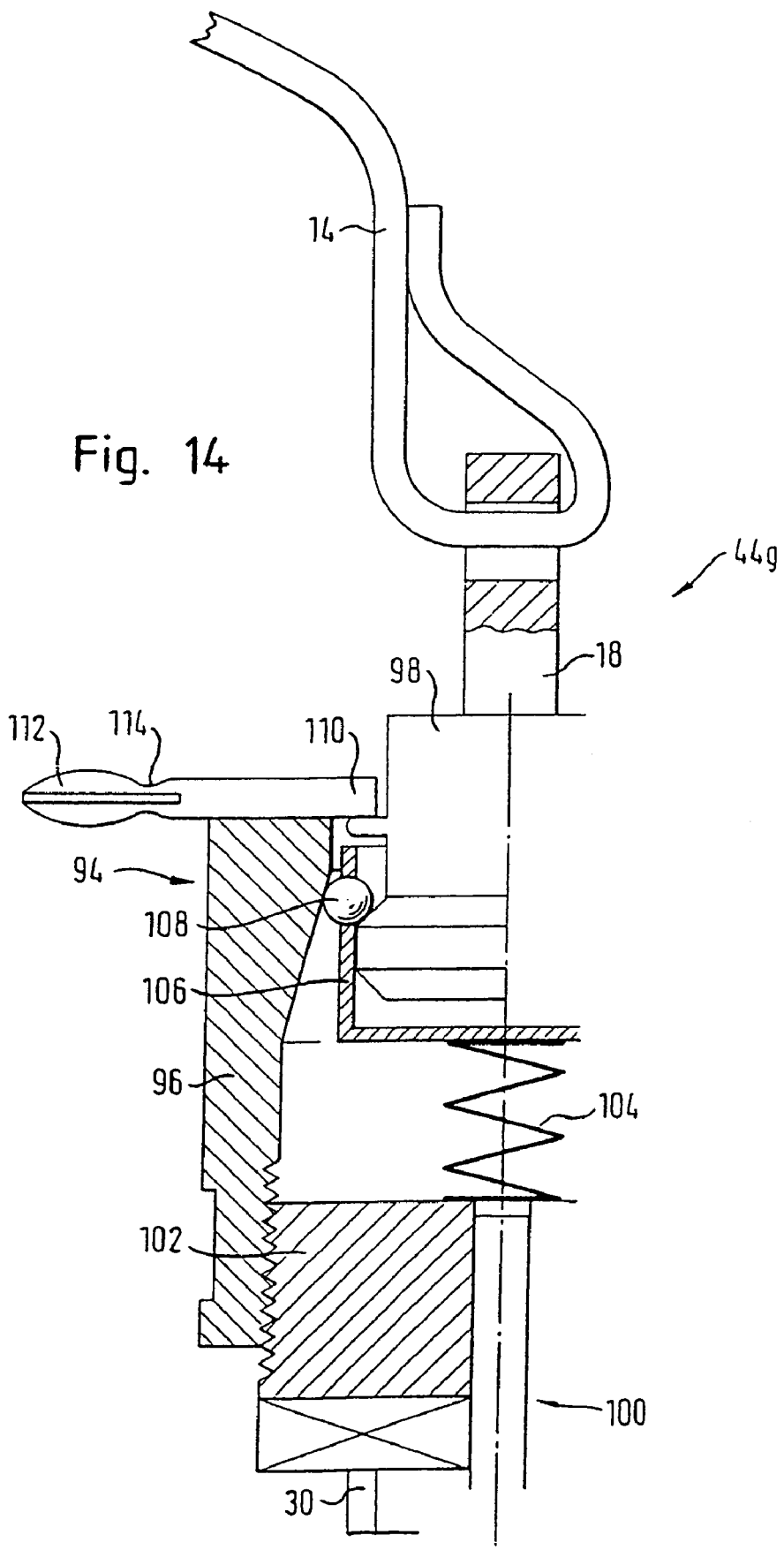

In FIG. 14, a ball and socket joint 44g is illustrated as a further embodiment of a connection element. A first coupling half 94, in connection with the fitting 18, has a threaded sleeve 96 and a coupling element 98 with chamfered sides. A second coupling half 100, which is connected with the engagement means 30, has a tensioning piece 102 with a hexagon constructed thereon, which has a thread which can be brought into engagement with the thread of the threaded sleeve 96. The threaded sleeve 96 likewise has a hexagon. On the second coupling half 100, a spring 104 is provided which biases a ball support 106 towards the fitting 18, this ball support carrying a ball 108, preferably a steel ball. When the two coupling halves 94, 100 are inserted one into another, the spring 104 is compressed by the coupling element 98, so that the ball 108 latches in place between an inclined portion constructed on the threaded sleeve 96 and one of the oblique faces of the coupling element 98. By screwing the threaded sleeve 96 onto the thread of the tensioning piece 102, the coupling is secured against unintentional detachment. On the threaded sleeve 96 in addition a plastic clip 110 is provided with a detent element 112, with which the connection element 44g can be fixed to the fastening element 22. The detent element 112 has a predetermined breaking point 114, so that in the case of a possible tensioning, the connection element 44g can come free from the fastening element 22. Such a predetermined breaking point can also be provided in all the other variants of the connection element.

The flexible vehicle occupant restraint system, constructed in modular assembly form, also has the advantage that the desired components can already be pre-assembled on the fastening element 22. Thus, for example, the belt buckle, the belt tensioner or tensioners and any deflections can already be fixed on the fastening element 22, before the latter is connected with the vehicle seat 24. The vehicle seat 24 can, as is usual in vehicle manufacture, be inserted into the vehicle as one of the last components. Preferably, one of the parts of a connection element is already either connected with the engagement means 30 or directly with the fastening element 22. In this case, after insertion of the vehicle seat into the vehicle, either a deflection fitting can be mounted into the belt webbing 14, which fitting has the respective second part of the connection element, the two parts, as described above, being able to be easily brought in connection with each other, in order to connect the fitting 18 with the fastening element 22. Alternatively, the end fitting, which is otherwise fastened to the vehicle, can be rapidly and simply connected with the respective second part of the connection element and then accordingly with the respective first part of the connection element.

The invention claimed is:

1. A vehicle occupant restraint system comprising:
   a safety belt arrangement, which has a belt webbing, a belt buckle and one of an end fitting and a deflection fitting;
   two tracks with which a vehicle seat is connected and which, for displacement of said vehicle seat, are constructed for engagement into counter-tracks fixed to a vehicle floor;
   an elongated, rigid fastening element which extends beneath said seat between said tracks and which is fixedly connected with both of said tracks; and
   at least one belt tensioner mounted on said fastening element intermediate said tracks, at a fixed location and orientation relative to said seat and tracks; wherein,
   said belt tensioner includes means for generating a retraction motion lengthwise along said fastening element; and
   said fastening element includes deflection means for redirecting and applying said retraction motion to at least one of said buckle and said fitting in a direction along a longitudinal axis of said webbing.

2. The vehicle occupant restraint system according to claim 1, wherein two belt tensioners are provided, which are both fastened to said fastening element.

3. The vehicle occupant restraint system according to claim 2, wherein:
   said system includes two belt tensioners; and
   one of said belt tensioners is a buckle tensioner and the other of said belt tensioners is a fitting tensioner for a fitting which is one of an end fitting and a deflection fitting.

4. The vehicle occupant restraint system according to claim 1, wherein:
   one of said at least one belt tensioner is connected with an engagement means;
   said engagement means is connected with one of said belt buckle and said fitting; and
   said fastening element has a deflection device for said engagement means.

5. The vehicle occupant restraint system according to claim 1, wherein:
   said fastening element has a guide for said fitting;
   said fitting moves in said guide during a tensioning process of said safety belt arrangement.

6. The vehicle occupant restraint system according to claim 1, wherein said fastening element and said at least one belt tensioner form a pre-assembled unit.

7. The vehicle occupant restraint system according to claim 1, wherein said fastening element has a deflection for a belt webbing of said safety belt arrangement.

8. The vehicle occupant restraint system according to claim 1, wherein:
   said belt tensioner is one of an end fitting tensioner and a deflection fitting tensioner; and
   said fastening element is a strut which is U-shaped in cross-section and extends upwards on a side of said belt tensioner, along said seat, forming U-shaped guide and a deflection for said belt webbing.

9. The vehicle occupant restraint system according to claim 1, wherein;
   upon activation of said at least one belt tensioner, said belt webbing is retracted in a longitudinal direction of said fastening element; and
   a belt webbing section has a reduced width in a region of said fastening element or is reduced in width during a retraction process.

10. The vehicle occupant restraint system according to claim 1, wherein:
    said belt tensioner is one of an end fitting tensioner and a deflection fitting tensioner; and
    during a tensioning process, lateral edges of said belt webbing are folded back inwardly and transversely to a longitudinal direction of said belt webbing.

11. The vehicle occupant restraint system according to claim 1, wherein:
    the fastening element has a U-shaped cross-section;
    width of said fastening element is reduced in a downward direction alone a side of said seat, becoming narrower than said belt webbing, whereby said belt webbing is folded as said belt webbing slides along said fastening element during a tensioning process.

12. The vehicle occupant restraint system according to claim 1, wherein:
    said belt tensioner is one of an end fitting tensioner and a deflection fitting tensioner; and
    a piece of said belt webbing which is to be drawn in is sewn together along a longitudinal direction of said belt webbing, such that a width of said belt webbing is reduced, such that its width is reduced.

13. The vehicle occupant restraint system according to claim 1, wherein:
    said belt tensioner is one of an end fitting tensioner and a deflection fitting tensioner which is connected with an engagement means; and
    a connection between said engagement means and said one of an end fitting and a deflection fitting is realized by a connection element.

14. The vehicle occupant restraint system according to claim 13, wherein a connection point provided between said engagement means and said fitting is attached to said fastening element via a detachable component.

15. The vehicle occupant restraint system according to claim 1, wherein a retaining device is provided on said fastening element which retaining device is coordinated with a geometry of said fitting and provides a direct fastening of said one of an end fitting and a deflection fitting to said fastening element.

16. The vehicle occupant restraint system according to claim 13, wherein:

said fitting has at least one eye;

said fastening element has a counter-bore; and a screw is provided which extends through said eye and said counter-bore and fixes said fitting to said fastening element.

17. The vehicle occupant restraint system according to claim 1, wherein:

said tracks and said fastening element form a pre-assembled slide to which said vehicle seat can be fastened; and said slide, said belt buckle and said at least one belt tensioner form a pre-assembled unit.

18. The vehicle occupant restraint system according to claim 1, further comprising a vehicle seat which is connected with said tracks.

19. The vehicle occupant restraint system according to claim 13, wherein said connection element comprises a screw coupling.

* * * * *